(12) United States Patent
Fujii et al.

(10) Patent No.: US 8,614,863 B2
(45) Date of Patent: Dec. 24, 2013

(54) ROW BAR WITH SMART SENSOR FOR FORMING SLIDERS AND METHOD OF MANUFACTURING SLIDER

(75) Inventors: Ryuji Fujii, Hong Kong (CN);
 Waikeung Lau, Hong Kong (CN);
 Guowei Li, DongGuan (CN); Longping Wang, DongGuan (CN); Xiangbin Xiao, DongGuan (CN); Quanbao Wang, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 620 days.

(21) Appl. No.: 12/805,694

(22) Filed: Aug. 13, 2010

(65) Prior Publication Data
 US 2011/0296673 A1 Dec. 8, 2011

(30) Foreign Application Priority Data
 Jun. 3, 2010 (CN) .......................... 2010 1 0201207

(51) Int. Cl.
 *G11B 5/60* (2006.01)
(52) U.S. Cl.
 USPC ...................................... 360/234.3
(58) Field of Classification Search
 USPC ............. 360/234.3, 234.4, 234.5, 234.6;
 29/602.1, 737, 603.16, 603.11, 603.13,
 29/603.14
 See application file for complete search history.

(56) References Cited

U.S. PATENT DOCUMENTS 7,788,796 B2 * 9/2010 Hsiao et al. ................ 29/603.16
2008/0144215 A1 * 6/2008 Hsiao et al. ............ 360/119.04

FOREIGN PATENT DOCUMENTS

CN 1329740 A 1/2002
CN 1825433 A 8/2006

* cited by examiner

*Primary Examiner* — Allen T Cao
(74) *Attorney, Agent, or Firm* — Nixon & Vanderhye PC

(57) ABSTRACT

A row bar with smart sensor for forming sliders, which comprises a row of slider forming portions, each slider forming portion comprising a slider to be cut from the row bar and a medial region adjacent the slider; each slider comprises a slider body and a magnetic writer disposed in the slider body, with the magnetic writer having a main pole which includes a pole face for being lapped, and all the main poles are arranged in a row; the row bar has at least one smart sensor disposed therein, with the smart sensor having at least three dummy poles, whose structure is identical to that of said main pole, arranged in the row of the main poles, there is a space between every two adjacent dummy poles of said smart sensor, and there is a offset in the direction vertical with the pole face between every two adjacent dummy poles of said smart sensor. The invention also discloses a method of manufacturing the slider.

15 Claims, 6 Drawing Sheets

ROW BAR WITH SMART SENSOR FOR FORMING SLIDERS AND METHOD OF MANUFACTURING SLIDER

FIELD OF THE INVENTION

This application claims priority to Chinese Application No. 201010201207.7 filed Jun. 3, 2010, the entire contents of which are hereby incorporated by reference in this application.

The present invention relates to information recording disk drive devices, and more particularly, to a row bar with smart sensor for forming sliders and a method of manufacturing the slider.

BACKGROUND OF THE INVENTION

The recording systems of magnetic read/write devices include a longitudinal magnetic recording system wherein signals are magnetized in the direction along the surface of the recording medium (the longitudinal direction), and a perpendicular magnetic recording system wherein signals are magnetized in the direction perpendicular to the surface of the recording medium. It is known that the perpendicular magnetic recording system is harder to be influenced by thermal fluctuation of the recording medium and capable of implementing higher linear recording density, compared with the longitudinal magnetic recording system. Therefore, perpendicular magnetic recording is a promising recording technique in which magnetic data bits on a magnetic recording disk are defined, such that their magnetic moments are perpendicular to the plane of the magnetic recording disk. The progress to perpendicular recording from longitudinal recording is seen as one of the advances that will allow the continued increase in data densities on magnetic recording disks in the future. In such a magnetic disk system based on perpendicular magnetic recording, a single-pole type magnetic head including a main pole having a pole face facing the magnetic disk and an auxiliary pole are used.

A slider of the perpendicular recording method has a thin film coil for generating a magnetic flux and a magnetic pole layer extending rearward from an air bearing surface and emitting the magnetic flux generated by the thin film coil toward a recording medium. The magnetic pole layer includes, for example, a track width specifying part having a width (uniform width) specifying the recording track width of a recording medium. The height of the track width specifying part in the magnetic pole layer, that is, the distance from the front end (the edge exposed in the air bearing surface) of the track width specifying part to the rear end (the edge on the side far from the air bearing surface) is a Neck Height as an important factor contributing to recording performances of the slider. In the slider of the perpendicular recording method, when current is passed to a thin film coil and a magnetic flux for recording is generated, the magnetic flux is emitted from the tip of the track width specifying part of the magnetic pole layer, thereby generating a magnetic field for recording (perpendicular magnetic field), and the surface of the recording medium is magnetized on the basis of the perpendicular magnetic field. In such a manner, information is magnetically recorded on the recording medium.

In a process of manufacturing the slider, the magnetic head structure is cut in rows of the magnetic head precursors, thereby obtaining a plurality of magnetic head row bars. After that, one end face (a cut face of the magnetic head structure) of the magnetic head row bar is polished so that the dimension of each polished recording head portion becomes a predetermined dimension, concretely, the neck height of the recording head portion becomes a predetermined dimension thereby forming an air bearing surface. After that, the magnetic head row bar in which the air bearing surfaces are formed is cut magnetic heads, thereby obtaining a plurality of sliders.

To assure operation performance of the thin film magnetic head, it is necessary to determine the neck height contributing to the recording performance with high precision, which are defined in the lapping process. The geometric shape of the main pole face close to the media surface affects the properties of a magnetic field for recording, it is required the main pole face of all magnetic heads with a high accuracy geometric shape to perform uniform recording performance. Due to the above-mentioned main pole structure, the main pole face geometric is sensitively related with the neck height. If the neck height was longer, the geometric shape of the main pole face will be smaller, if the neck height was shorter, the geometric shape of the main pole face will be bigger correspondingly. Based on this reason, in order to obtain the uniformed main pole face geometric shape, it is needed to detect the accurate lapping stop point during magnetic head manufacturing. Actually, the final pole face is formed by a precision lapping process. To know lapping stop at right point will be critical to form accurate main pole geometric shape, and it is a major task for the perpendicular magnetic head lapping process.

Controlling the lapping process is typically achieved through the use of electrical lapping guides (ELGs) which are placed in multiple locations on the magnetic head row bar. Traditionally, an ELG is a metal layer deposits between two sliders, while the ELG is placed on the slider in the improved technology recently. In some instances, the slider may also include one or more ELGs. The ELG has a resistance that varies as the material is removed during a lapping process and thus may be used to monitor lapping during slider manufacturing. Lapping the ELG causes the electrical resistance to increase. Thus, by monitoring the ELG along the row bar and adjusting the pressure being applied to the row bar at different locations along its length, lapping process can be controlled. Lapping process is terminated when the ELG resistance reaches the threshold value. However, the using of the ELG is such limited for lapping process. Another technology is described in U.S. Pat. No. 7,336,442, in which indicator members are used. The row bar for lapping process has two indicator members disposed therein, with one being a regular triangle and the other being inverted triangle. The main pole and the indicator members are lapped synchronously, and the lapping process is terminated when the shape of the lapping surface of the regular triangle and the inverted triangle are identical. Owing to the structure difference between the indicator members and the main pole, when the shapes of the lapping surface of two triangles are identical, the wide of the main pole dose not always reach the predetermined width, and in turns, the accurate lapping vale is not available in next process. Furthermore, because testing the lapping surface of the regular triangle and the inverted triangle while being lapped is not available, the lapping process is just based on the experience of the skilled to determinate the terminated time, so it could not be accurate enough. Hence, the there is a limited to the lapping process using the said indicators.

Accordingly, a need has arisen for providing an improved row bar for forming sliders and the method of manufacturing the slider, which is accurate enough to achieve improvement of the slider performance, and to overcome the above-mentioned drawbacks.

SUMMARY OF THE INVENTION

One objective of the present invention is to provide a row bar with smart sensor for forming sliders, the row bar having main poles and at least one smart sensor composed of a plurality of dummy poles disposed therein, with the dummy pole structure being identical to that of said main pole; there is a spaces between every two adjacent dummy poles of said smart sensor, and there is a offset in the direction vertical with the pole face between every two adjacent dummy poles. Therefore, the shape of the final pole surface of the main pole could be accurately controlled to form with the guide of the smart sensor during the lapping process, whereby the performance of the slider is greatly improved.

Another objective of the present invention is to provide a method of manufacturing slider cut from a row bar, the row bar having main poles and at least one smart sensor composed of a plurality of dummy poles disposed therein, with the dummy pole structure being identical to that of said main pole; there is a the space between every two adjacent dummy poles of said smart sensor, and there is a offset in the direction vertical with the pole face between every two adjacent dummy poles. Therefore, the shape of the final pole surface of the main pole could be accurately controlled to form with the guide of the smart sensor during the lapping process, whereby the performance of the slider is greatly improved.

To achieve the above-mentioned objects, the present invention provides a row bar with smart sensor for forming sliders, which comprises a row of slider forming portions, each slider forming portion comprising a slider to be cut from the row bar and a medial region adjacent the slider; each slider comprises a slider body and a magnetic writer disposed in the slider body, with the magnetic writer having a main pole which includes a pole face for being lapped, and all the main poles are arranged in a row; the row bar has at least one smart sensor disposed therein, with the smart sensor having at least three dummy poles, whose structure is identical to that of said main pole, arranged in the row of the main poles, there is a space between every two adjacent dummy poles of said smart sensor, and there is a offset in the direction vertical with the pole face between every two adjacent dummy poles of said smart sensor.

As an embodiment of the present invention, each medial region of the row bar is equipped with said smart sensor.

As another embodiment of the present invention, each slider body of the row bar is equipped with said smart sensor.

As still another embodiment of the present invention, the smart sensor of the low bar has four dummy poles.

As still another embodiment of the present invention, the offsets in the direction vertical with the pole face between every two adjacent dummy poles of said smart sensor are identical.

As still another embodiment of the present invention, the spaces between every two adjacent dummy poles of said smart sensor are identical.

The present invention also provides a method of manufacturing a slider, and the method comprises: providing a row bar having a row of slider forming portions, each slider forming portion comprising a slider body and a medial region adjacent the slider body; forming a magnetic writer in each slider body, with the magnetic writer having a main pole which includes a pole face for being lapped, and all the main poles being arranged in a row; forming at least one smart sensor in the row bar, the smart sensor having at least three dummy poles, whose structure is identical to that of said main pole, arranged in the row of the main poles, and there is a space between every two adjacent dummy poles of said smart sensor, and there is a offset in the direction vertical with the pole face between every two adjacent dummy poles of said smart sensor; lapping the row bar with the guide of the smart sensor; and cutting the slider bodies to obtain sliders from the row bar.

As an embodiment of the present invention, the step of lapping the row bar with the guide of the smart sensor comprises: lapping the main poles together with the smart sensors to a predetermined value; measuring to obtain the width of each dummy pole of the smart sensor; measuring to obtain the height of each dummy pole of the smart sensor; and lapping the main pole with the guide of the width and the height of the dummy pole.

As another embodiment of the present invention, the step of lapping the row bar with the guide of the smart sensor comprises: lapping the main poles together with the smart sensors to a predetermined value; measuring to obtain the width and the height of each dummy pole of the smart sensor; measuring to obtain the width of the main pole within the slider; making a relationship line in view of the width and the height of each dummy pole of the smart sensor; figuring out the lapping height value in view of the relationship line and the width of the main pole within the slider; and lapping the main pole based on the lapping height value.

As another embodiment of the present invention, the height of each dummy pole of the smart sensor is measured with the guide of electrical lapping guide.

As still another embodiment of the present invention, each medial region of the row bar is equipped with said smart sensor.

As yet another embodiment of the present invention, each slider body is equipped with said smart sensor. Preferably, the smart sensor deposited in the row bar has four dummy poles.

As yet another embodiment of the present invention, the offsets in the direction vertical with the pole face between every two adjacent dummy poles of said smart sensor are identical.

As still another embodiment of the present invention, the spaces between every two adjacent dummy poles of said smart sensor are identical.

In comparison with the prior art, the row bar has main poles and at least one smart sensor composed of a plurality of dummy poles disposed therein, with the dummy pole structure being identical to that of said main pole; there is a space between every two adjacent dummy poles of said smart sensor, and there is a offset in the direction vertical with the pole face between every two adjacent dummy poles. Therefore, the shape of the final pole surface of the main pole could be accurately controlled to form with the guide of the smart sensor during the lapping process, whereby the performance of the slider is greatly improved.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 5b is an enlarged view illustrating the layout of the main pole and the smart sensor of the row bar according to the first embodiment of the invention as shown in FIG. 5a;

FIG. 6b is an enlarged view illustrating the layout of the main pole and the smart sensor of the row bar according to the first embodiment of the invention as shown in FIG. 6a;

DETAILED DESCRIPTION OF ILLUSTRATED EMBODIMENTS

Figure 1:
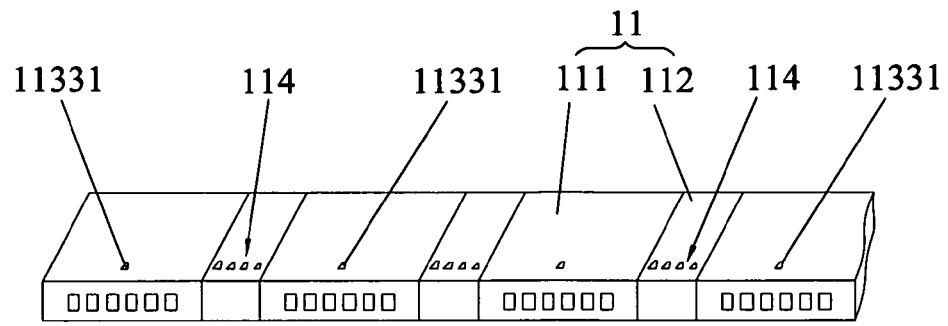
FIG. 1 is a partial schematic illustration of a row bar with smart sensors according to the first embodiment of the invention.

Various preferred embodiments of the invention will now be described with reference to the figures, wherein like reference numerals designate similar parts throughout the various views. As indicated above, the invention is directed to row bar for forming sliders, the row bar having main poles and at least one smart sensor composed of a plurality of dummy poles disposed therein, with the dummy pole structure being identical to that of said main pole; the spaces between every two adjacent dummy poles of said smart sensor are identical, and there is a offset in the direction vertical with the pole face between every two adjacent dummy poles. Therefore, the shape of the final pole surface of the main pole could be accurately controlled to form with the guide of the smart sensor during the lapping process, whereby the performance of the slider is greatly improved.

Figure 2:
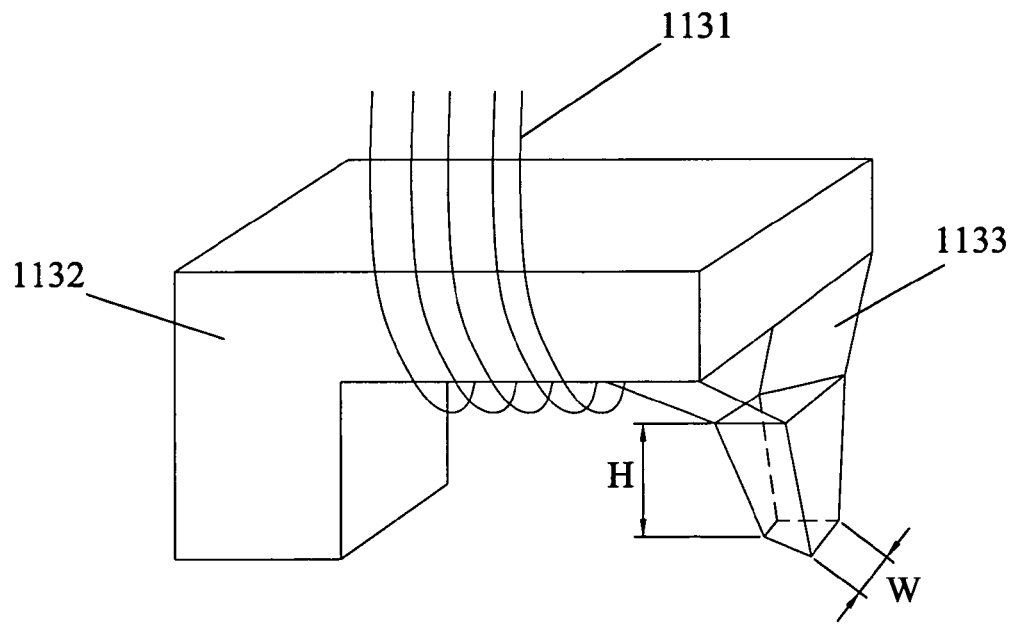
FIG. 2 is a schematic illustration of a magnetic writer disposed in the slider of the row bar according to the embodiment of the invention.

FIG. 1 demonstrates a row bar according to the first embodiment of the invention. As known in the art, a row bar which is cut from a wafer is using for forming sliders. Referring to FIGS. 1-2, the row bar 1 has a plurality of slider forming portions 11 which are arranged in a row. Each slider forming portion 11 has a slider 111 to be cut from the row bar 1 and a medial region 112 adjacent the slider 111. Each slider 111 comprises a slider body and a magnetic writer 113 disposed in the slider body. The magnetic writer 113 generally includes a thin film coil 1131, a writer shield 1132, and a main pole 1133. The thin film coil 1131 is wrapped on the writer shield 1132, and the main pole 1133 is integrated with one end of the write shield 1132. The thin film coil 1131 generates magnetic flux and the magnetic flux run through the main pole 1133 to the air bearing surface (not shown) for emitting the magnetic toward a recording medium, so the information recording into the recording medium is achieved.

Figure 3:
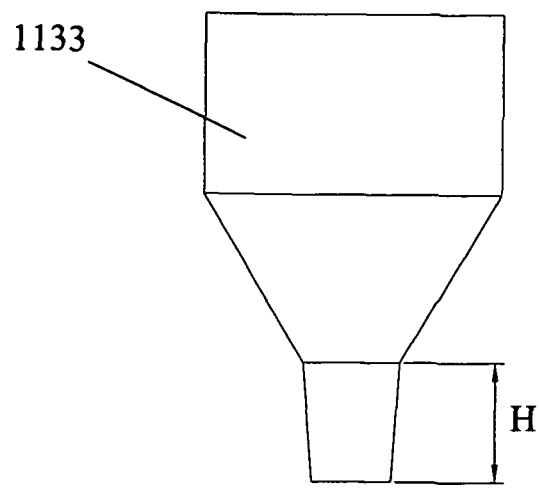
FIG. 3 is a side view illustrating the main pole of the magnetic writer as shown in FIG. 2.
Figure 4:
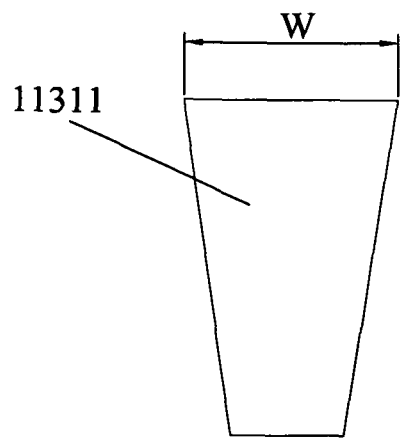
FIG. 4 is a schematic illustration of the pole face of the main pole within the magnetic writer as shown in FIG. 2.
Figure 5A:
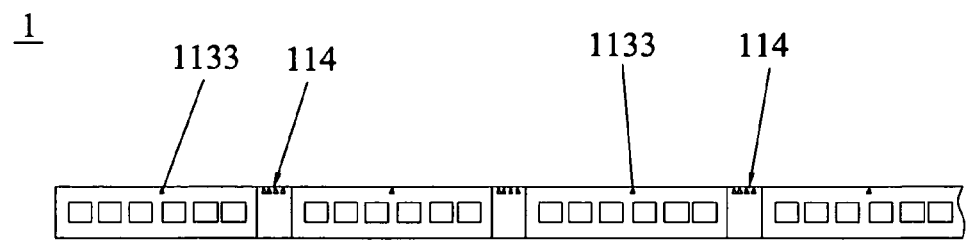
FIG. 5a is a side view illustrating the row bar according to the first embodiment of the invention as shown in FIG. 1.
Figure 5B:
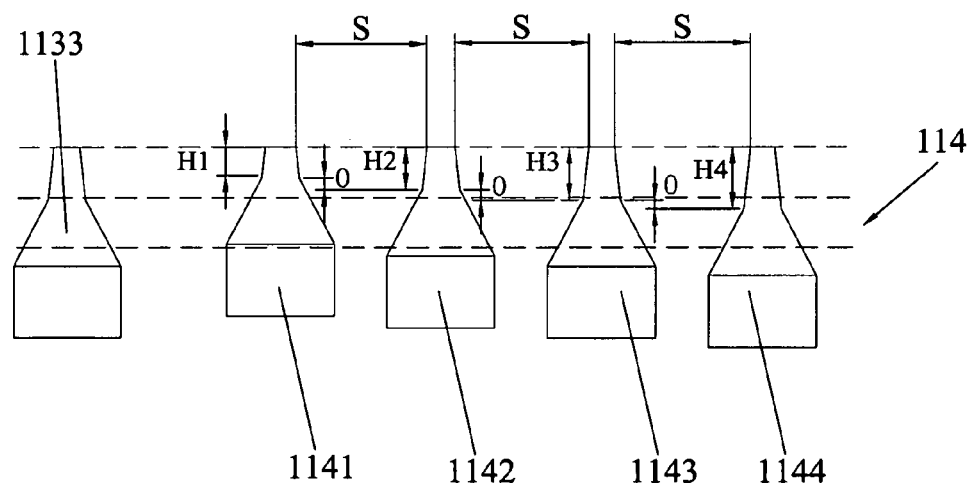
Figure 6A:
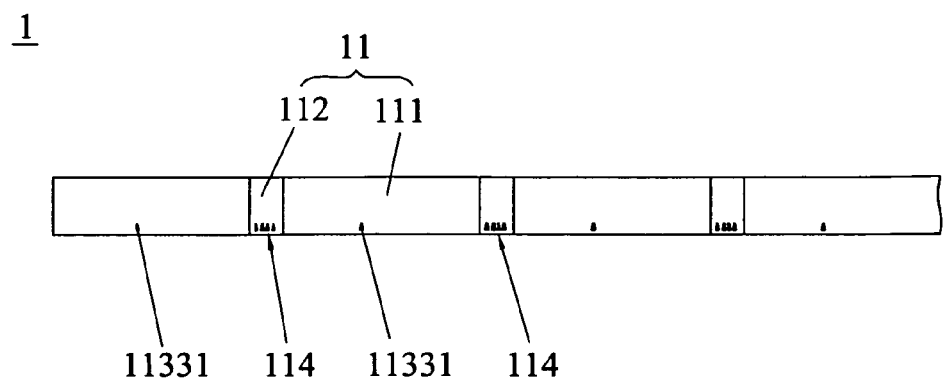
FIG. 6a is a top view illustrating the row bar according to the first embodiment of the invention as shown in FIG. 1.
Figure 6B:
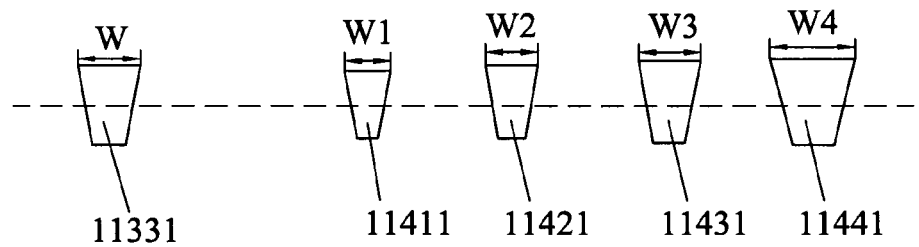

Referring to FIGS. 2-4, the main pole 1133 is made of magnetic material adapted for recording information on the recording medium (e.g. disk). The end of the main pole 1133 which is coupled to the writer shield 1132 has a width greater than that of the other end which is close to the recording medium. Closer to the end coupled to the writer shield 1132, greater the cross section width of the main pole 1133 is; likewise, closer to the end near the recording medium, smaller the cross section width of the main pole 1133 is. The main pole 1133 includes a pole face 11331 closer to the recording medium for being lapped. Furthermore, the main pole 1133 has a pole width W of the pole face 11331 and a neck height H, with the neck height H defining the pole width W. Owing to the structure feature of the main pole, if the neck height H is longer, the pole width W is smaller, then, if the neck height H is shorter, the pole width W is greater. The recoding performance of the magnetic writer 113 is determined by the pole width W of the final pole face 11331 after lapping process on the main pole 1133.

FIG. 1 is a partial schematic illustration of a row bar with smart sensors according to the first embodiment of the invention. Referring to FIGS. 1 and 5a-6b, the pole face 11331 is exposed to the air bearing surface of the slider 111 for being lapped. The main poles 1133 are arranged in a row within the row bar 1. Furthermore, the row bar 1 has three smart sensors 114 disposed therein, with each smart sensor 114 having four dummy poles, which are the first dummy pole 1141, the second dummy pole 1142, the third dummy pole 1143, and the fourth dummy pole 1144. All the smart sensors 114 are arranged on the medial region 112. The structure of each dummy poles is identical to that of said main pole 1133 and the first dummy pole 1141, the second dummy pole 1142, the third dummy pole 1143, and the fourth dummy pole 1144 are arranged in the row of the main poles 1133, so that the main pole 1133 could be lapped with the guide of the smart sensor 114. In this embodiment, the spaces S between every two adjacent dummy poles of said smart sensor are identical, namely, the spaces S between the first dummy pole 1141 and the second dummy pole 1142, the second dummy pole 1142 and the third dummy pole 1143, and the third dummy pole 1143 and the fourth dummy pole 1144 are identical to each other. There is an offset O in the direction vertical with the pole face 11331 between every two adjacent dummy poles of said smart sensor 114. The offsets O between the first dummy pole 1141 and the second dummy pole 1142, the second dummy pole 1142 and the third dummy pole 1143, and the third dummy pole 1143 and the fourth dummy pole 1144 are identical to each other. When lapping the row bar 1, the main pole 1133 and the smart sensor 114 would be lapped synchronously. Because there is an offset O between every two adjacent dummy poles of said smart sensor 114, the first pole surface 11411 of the first dummy pole 1141, the second pole surface 11421 of the second dummy pole 1142, the third pole surface 11431 of the third dummy pole 1143, and the fourth pole surface 11441 of the fourth dummy pole 1144 are different from each other.

Figure 7:
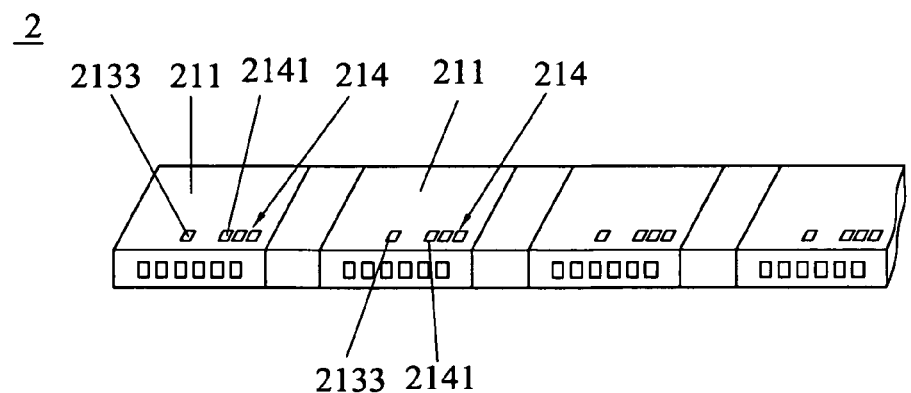
FIG. 7 is a partial schematic illustration of a row bar with smart sensors according to the second embodiment of the invention.
Figure 8:
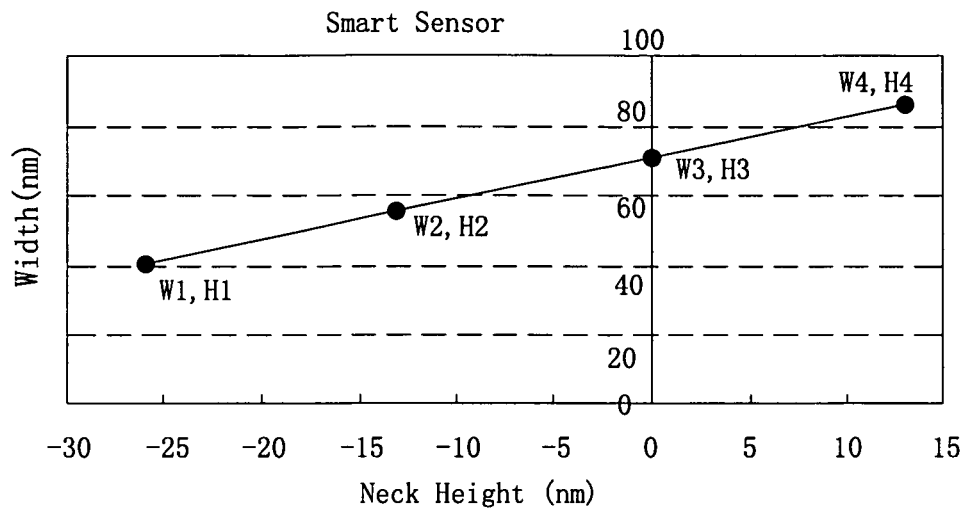
FIG. 8 is a chart illustrating the relationship line in view of the width and the height of the dummy pole of the smart sensor according to the embodiment of the invention.
Figure 9:
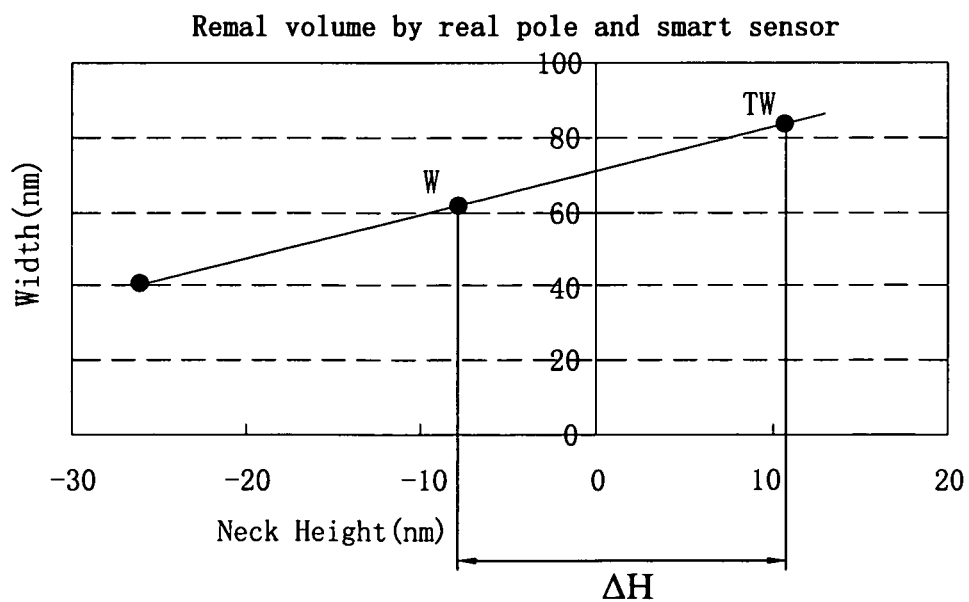
FIG. 9 is a chart illustrating the relationship line in view of the width and the height of the dummy pole of the smart sensor and the width of the main pole according to the embodiment of the invention.

FIG. 7 illustrates a partial view of a row bar with smart sensors according to the second embodiment of the invention. Within this embodiment, the row bar 2 has a plurality of slider 211, with each slider 211 having a smart sensor 214 including three dummy poles 2141 disposed thereon. All main poles 2133 and the dummy poles 2141 are arranged in a row. The structure of the row bar 2 is similar to that of the row bar 1 according to the first embodiment as seen in FIGS. 1-6b, except that the smart sensors 214 are arranged on the slider 211.

Figure 10:
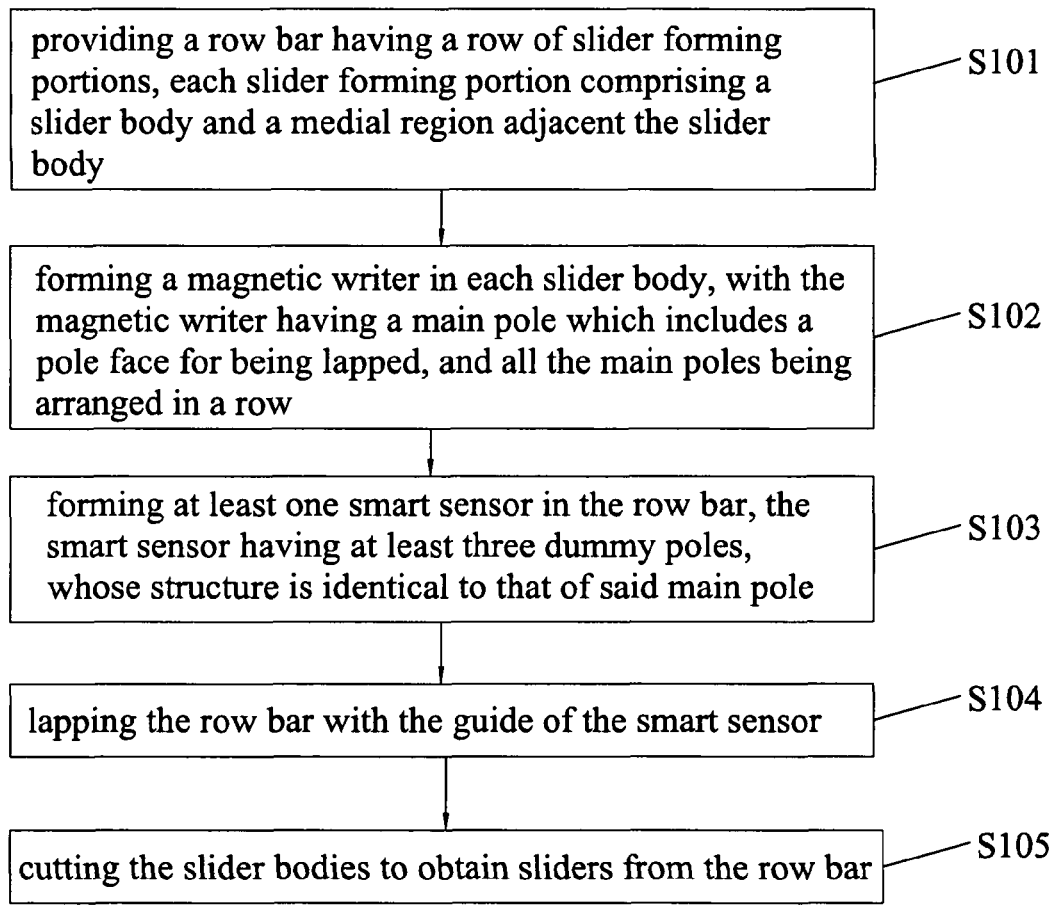
FIG. 10 is a flow chart illustrating a method for manufacturing slider according to the embodiment of the invention.

FIG. 10 is a flow chart illustrating a method for forming slider according to a preferential embodiment of the invention, and the method is carried out in the following order: providing a row bar having a row of slider forming portions, each slider forming portion comprising a slider body and a medial region adjacent the slider body (step 101); forming a magnetic writer in each slider body, with the magnetic writer having a main pole which includes a pole face for being lapped, and all the main poles being arranged in a row (step 102); forming at least one smart sensor in the row bar, the smart sensor having at least three dummy poles, whose structure is identical to that of said main pole, arranged in the row of the main poles, with the spaces between every two adjacent dummy poles of said smart sensor being identical, and the offsets in the direction vertical with the pole face between every two adjacent dummy poles of said smart sensor being identical (step 103); lapping the row bar with the guide of the smart sensor (step 104); and cutting the slider bodies to obtain sliders from the row bar (step 105).

Now referring to FIGS. 1-6*b* and 8-10, the step 104 of the method for manufacturing a slider, which is carried out by lapping the row bar with the guide of the smart sensor, would be specifically described hereinafter associated with the first embodiment. Firstly, lap the main poles 1133 together with the smart sensors 114 to a predetermined value, which is called preliminary lapping. Secondly, measure the width of each dummy pole of the smart sensor 114 via an optical equipment, then the width W1 of the first pole face 11411 of the first dummy pole 1141, the width W2 of the second pole face 11421 of the second dummy pole 1142, the width W3 of the third pole face 11431 of the third dummy pole 1143, and the width W4 of the fourth pole face 11441 of the fourth dummy pole 1144 are obtain; and measure the neck height of each dummy pole of the smart sensor 114 with the guide of electrical lapping guide (ELG), then the neck height H1 of the first dummy pole 1141, the neck height H2 of the second dummy pole 1142, the neck height H3 of the third dummy pole 1143, and the neck height H4 of the fourth dummy pole 1144 are obtain. Thirdly, measure to obtain the pole width W of the pole face 11331 of the main pole 1133 within the slider 111 through the optical equipment. Fourthly, make a coordinate axis regarding to the width of the pole face and the neck height, then make a relationship line described in the coordinate axis in view of the width of the pole face and the neck height of each dummy pole of the smart sensor; referring to FIGS. 8, the relationship line is illustrated in view of W1 and H1, W2 and H2, W3 and H3, and W4 and H4. Fifthly, referring to FIG. 9, figure out the lapping height value ΔH in view of the relationship line, the pole width W of the main pole 1133, and the target width TW of the main pole 1133. Sixthly, lap the main pole 1133 based on the lapping height value ΔH, then the slider is obtain.

The above-mentioned steps according to the method of the invention could either in proper order, or in any other order, which are depends on the specific manufacturing method. The method in accordance with manufacturing the slider from a row bar is also applied for the second embodiments of the invention.

It should be noted that the material, the shape, and the structure of the dummy poles of the smart sensor are totally identical to that of the main poles; the number of the dummy pole could be three or other number else; the spaces between every two adjacent dummy poles of said smart sensor could be different from each other; the offset between every two adjacent dummy poles of said smart sensor could be different; the smart sensor could be arranged on the medial region or on the slider, and the number of the smart sensor could be one for a row bar, or a plurality of smart sensor arranged on the row bar, the above-mentioned layout are depend on the specific embodiments according to the invention. The width of each dummy pole could be measured via an optical equipment, but not limited to the optical equipment, the other measuring equipment could be used in this place.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A row bar with smart sensor for forming sliders, comprising a row of slider forming portions, each slider forming portion comprising a slider to be cut from the row bar and a medial region adjacent the slider;
   wherein each slider comprises a slider body and a magnetic writer disposed in the slider body, with the magnetic writer having a main pole which includes a pole face for being lapped, and all the main poles are arranged in a row;
   wherein the row bar has at least one smart sensor disposed therein, with the smart sensor having at least three dummy poles, whose structure is identical to that of said main pole, arranged in the row of the main poles, there is a space between every two adjacent dummy poles of said smart sensor, and there is an offset in the direction vertical with the pole face between every two adjacent dummy poles of said smart sensor.

2. The row bar with smart sensor according to claim 1, wherein each medial region is equipped with said smart sensor.

3. The row bar with smart sensor according to claim 1, wherein each slider body is equipped with said smart sensor.

4. The row bar with smart sensor according to claim 2, wherein the smart sensor has four dummy poles.

5. The row bar with smart sensor according to claim 1, the offsets in the direction vertical with the pole face between every two adjacent dummy poles of said smart sensor are identical.

6. The row bar with smart sensor according to claim 1, wherein the spaces between every two adjacent dummy poles of said smart sensor are identical.

7. A method of manufacturing slider, the method comprising:
   providing a row bar having a row of slider forming portions, each slider forming portion comprising a slider body and a medial region adjacent the slider body;
   forming a magnetic writer in each slider body, with the magnetic writer having a main pole which includes a pole face for being lapped, and all the main poles being arranged in a row;
   forming at least one smart sensor in the row bar, the smart sensor having at least three dummy poles, whose structure is identical to that of said main pole, arranged in the row of the main poles, and there is a space between every two adjacent dummy poles of said smart sensor, and there is an offset in the direction vertical with the pole face between every two adjacent dummy poles of said smart sensor;
   lapping the row bar with the guide of the smart sensor; and cutting the slider bodies to obtain sliders from the row bar.

8. The method according to claim 7, wherein the step of lapping the row bar with the guide of the smart sensor comprises:
   lapping the main poles together with the smart sensors to a predetermined value;
   measuring to obtain the width of each dummy pole of the smart sensor;
   measuring to obtain the height of each dummy pole of the smart sensor; and
   lapping the main pole with the guide of the width and the height of the dummy pole.

9. The method according to claim 7, wherein the step of lapping the row bar with the guide of the smart sensor comprises:
- lapping the main poles together with the smart sensors to a predetermined value;
- measuring to obtain the width and the height of each dummy pole of the smart sensor;
- measuring to obtain the width of the main pole within the slider;
- making a relationship line in view of the width and the height of each dummy pole of the smart sensor;
- figuring out the lapping height value in view of the relationship line and the width of the main pole within the slider; and
- lapping the main pole based on the lapping height value.

10. The method according to claim 8, wherein the height of each dummy pole of the smart sensor is measured with the guide of electrical lapping guide.

11. The method according to claim 7, wherein each medial region is equipped with said smart sensor.

12. The method according to claim 7, wherein each slider body is equipped with said smart sensor.

13. The method according to claim 8, wherein the smart sensor has four dummy poles.

14. The method according to claim 7, the offsets in the direction vertical with the pole face between every two adjacent dummy poles of said smart sensor are identical.

15. The row bar with smart sensor according to claim 7, wherein the spaces between every two adjacent dummy poles of said smart sensor are identical.

* * * * *